United States Patent Office 3,155,681
Patented Nov. 3, 1964

3,155,681
DIEPOXY-1,3,5-TRIMETHYLENE TRISULFONES AND THEIR PREPARATION
Horst Kramer and Franz Sturzenhofecker, Marl, Kreis Recklinghausen, Germany, assignors to Chemische Werke Huls, Aktiengesellschaft, Marl, Kreis Recklinghausen, Germany
No Drawing. Filed Oct. 2, 1962, Ser. No. 228,220
Claims priority, application Germany Nov. 4, 1961
6 Claims. (Cl. 260—327)

This invention relates to new epoxide polymers and, in particular, to such polymers which are devoid of any ether linkages in the chain.

It is known that hardenable epoxide compounnds may be obtained by reacting epichlorohydrin with phenols. In conventional practice, employed phenols are bivalent, and, in particular, are binuclear phenols (bisphenols). The phenol moieties in the resultant initial resinous products are linked, through ether oxygen atoms, to propyl groups which are introduced by the epichlorohydrin molecules. These linkages by ether groups are chemically sensitive and this fact deleteriously affects the properties of resins, and protective coatings produced therefrom.

It is therefore desirable to bind the epichlorohydrin to a multivalently reacting substance in such a way that a carbon-carbon bond is formed without loss of the epoxide group.

The reaction products of epichlorohydrin with sulfur compounds as previously proposed have not solved this problem as there is at least one reactive hydrogen atom on the sulfur in the sulfur compounds concerned; thioethers being formed thereby.

The principal object of this invention, therefore, is to provide novel diepoxide compounds which are devoid of ether linkages in the chain.

Another object is to provide such ether-free diepoxide compounds which also contain unsaturated polymerizable side chains.

Still a further object is to provide a process for the production of the novel compounds of this invention.

Other objects and advantages of this invention will become apparent upon further study of the specification and appended claims.

It has been found that sulfur-containing, hardenable diepoxides free of ether groups in the chain, are obtained if a 1,3,5-trimethylene trisulfone is reacted with epichlorohydrin in an alkaline medium. Suitable for the reaction is the 1,3,5-trimethylene trisulfone itself as well as the derivatives thereof substituted by a saturated or unsaturated aliphatic, cycloaliphatic or aromatic hydrocarbon substituent, e.g., allyl-, cyclopentenyl- or benzyl-1, 3, 5-trimethylene trisulfones; equally suitable are compounds, the side chain of which is bound to the ring through a functional group, such as ethoxytrimethylene trisulfone or acetyl trimethylene trisulfone. It is equally possible to utilize a mixture of such compounds.

The structural formula of the diepoxides of this invention is as follows:

(3) An unsaturated aliphatic hydrocarbon group having 2–18 carbon atoms and containing 1–3 double bonds, for example allyl, crotyl, methallyl, methylpentenyl, ethylhexenyl, pentadien-2,4-yl-1, undecenyl, dodecenyl and 9,12,15-octadecatrienyl, (4) A cycloaliphatic hydrocarbon group having 5–12 carbon atoms, and containing 0–3 double bonds, for example cyclopentenyl, cyclohexyl, cyclohexenyl, endomethylene cyclohexenyl, tricyclodecenyl, cyclooctenyl, cyclooctadienyl, cyclododecyl, cyclododecenyl, cyclododecatrienyl, dihydronaphthyl, tetrahydronaphthyl, (5) An aromatic hydrocarbon group, for example phenyl, naphthyl, (6) A substituted aromatic hydrocarbon group

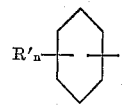

wherein $n$ represents a numerical value between 1 and 4 and R' is selected from the group consisting of the preceding groups 2–4, for example tolyl, xylyl, p-methoxyphenyl, (7) An aralkyl hydrocarbon group having 7–17 carbon atoms, for example benzyl, naphthylmethyl, hexylnaphthylmethyl, p-phenylbenzyl, 3,5-dimethylbenzyl, p-methoxybenzyl, (8) An ether group, R''—O—, wherein R'' is selected from the group consisting of the preceding groups 2–7, for example ethoxy, phenhydroxy, allylhydroxy, crotylhydroxy, endomethylene tetrahydrobenzylhydroxy, tricyclodecenyl-hydroxy, (9) An acyl group R''—CO—, wherein R'' is selected from the group consisting of the preceding groups 2–7, for example acetyl, benzoyl, phenylacetyl, undecenoyl, cyclohexanoyl, and wherein $x$ represents a numerical value between 0 and about 20, preferably between 0 and about 10.

To produce these compounds, the reaction is effected in an alkaline medium, e.g., in aqueous solutions of sodium- or potassium-hydroxide at a pH of 8–15, preferably 11–14. In some cases, for example, if the hydrocarbon-substituted 1,3,5-trimethylene trisulfones are utilized, the dissolving power of the aqueous alkalies is not sufficient to fully complete the reaction in a homogeneous solution. It is then possible to increase the dissolving power of the aqueous alkalies by adding thereto an inert water-soluble organic solvent. Suitable solvents which do not participate in the reaction at the chosen reaction temperature and do not attack the epoxide groups, are, e.g., lower alcohols, ketones, dioxane, etc. Furthermore, by utilizing such solvents, the most advantageous reaction temperatures may easily be maintained.

It is advisable to effect the reaction in such a way that the solution 1,3,5-trimethylene trisulfone dissolved in aqueous alkalies is first prepared, and then the epichlorohydrin is added in portions while being stirred; it also may be necessary to provide cooling means so that

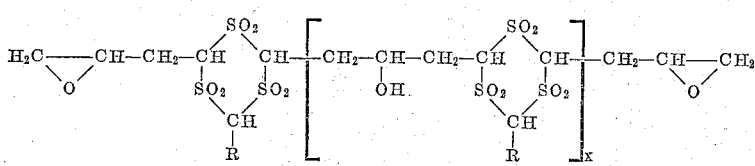

wherein R represents any of the following substituents:
(1) Hydrogen,
(2) An alkyl group having 1–17 carbon atoms, for example methyl, ethylhexyl, dodecyl, iso-octadecyl, the temperature does not increase above 80° C. in view of the danger of opening of the epoxide ring. At temperatures between −10 and +60° C., the reaction takes place extremely rapidly and it is essentially completed within a few minutes. The entire amount of epichlorohydrin may also be added in one portion (if desired).

Still further, a preferred method of this invention involves the addition of 1,3,5-trimethylene trisulfone dissolved in aqueous alkali, if necessary in portions, to a container filled with a large excess of epichlorohydrin. This technique results in the production of a resin which consists to a large extent of diepoxides of the same chain length, on account of the permanently present excess of epichlorohydrin.

After completion of the reaction, it is advisable to precipitate the diepoxide by acidifying the solution. The precipitate is then freed of inorganic impurities by means of a water wash and then it is dried.

The epichlorohydrin is generally employed in a molar proportion to 1,3,5-trimethylene trisulfone of at least 2:1 when it is desired to produce a low-molecular weight diepoxide with a high epoxide number. By reducing this proportion, the average chain length of the resins may be increased whereby the epoxide number and the reactivity of the resins is decreased. On account of this, the resins which are to be processed in the dissolved or melted state, contain on the average about 1 to about 10 1,3,5-trimethylene trisulfone nuclei in the chain.

It has become evident that unsubstituted 1,3,5-trimethylene trisulfone reacts bivalently under the chosen reaction conditions while forming chain molecules whereas the third $CH_2$ group present in the nucleus generally remains non-participating.

The solubility of the diepoxides in organic solvents such as aromatic substances, alcohols, ketones, ethers, halogen hydrocarbons, etc., depends on the average molecular weight, on the one hand, and on the substituent attached to the 1,3,5-trimethylene trisulfone, on the other hand. Dimethylformamide and dimethyl sulfoxide generally have a particularly high dissolving power.

The melting points of the novel diepoxides of this invention are dependent on the specific 1,3,5-trimethylene trisulfones which are employed. In general, the substituted derivatives yield lower melting compounds.

Because of the extraordinary reactivity of the epoxide as well as hydroxy groups, the new diepoxides can be reacted with many other compounds, e.g., with water, acids, acid anhydrides, halogenides, amides, phenols, alcohols, amines, etc. The diepoxides thus represent valuable intermediate products, for example, for the production of cross linked and/or saturated polyester resins, alkyd resins, wetting agents, and textile auxiliary agents.

In particular, the diepoxides can be hardened by mixing with primary, secondary or tertiary amines or acid anhydrides, such as phthalic acid anhydride or pyromellitic acid anhydride. This hardenability property of the diepoxides also permits their utilization in final products as casting resins, adhesives, coatings, etc. With respect to other specific compounds which can be used as cross linking or hardening agents, and to catalysts which can be employed for the hardening reaction, attention is invited to the following references: A. M. Pacquin, Epoxydverbindungen und Epoxydharze, Springer-Verlag, 1958, Seite 461–528.

The hardened resins possess an excellent stability against chemical agents, as they contain no ether grouping in the chain, but consist merely of hydrocarbon groups and the extremely resistant 1,3,5-trimethylene trisulfone nuclei. The extraordinary adhesiveness of the hardened resins on glass and metallic surfaces must be particularly emphasized.

Resins of unsubstituted, as well as substituted, 1,3,5-trimethylene trisulfone are suitable as coating materials. The specific trisulfone is selected according to whether the coating is to be particularly hard or particularly flexible. Furthermore, on account of the existing reactivity with a variety of basic varnish substances, the diepoxides can be widely utilized in the varnish field. It is, therefore, possible, for example, to obtain air-drying or oven-drying lacquers with excellent weather and chemical resistance and which are distinguished by outstanding luster, hardness and flexibility.

Resins produced from 1,3,5-trimethylene trisulfone substituted by unsaturated alkyl residues, e.g., from allyltrimethylene trisulfone, may also be hardened with the aid of peroxides or may be further condensed, for example after being reacted with unsaturated fatty acids, and be hardened simultaneously or subsequently according to one of the methods mentioned above.

Without further analysis, it is believed that the preceding description of the invention enables one skilled in the art to utilize this invention to its fullest extent. Consequently, the following preferred specific embodiments of this invention are given merely for the purposes of illustration, and are not intended to be limitative of the remainder of the specification and appended claims in any way whatsoever.

*Example 1*

9.25 g. (0.1 mol) of epichlorohydrin are added to 11.7 g. (0.05 mol) of 1,3,5-trimethylene trisulfone in 150 cc. of 1 N sodium hydroxide. The mixture is stirred for 15 min. at 20° C. and neutralized with the aid of hydrochloric acid thereafter, whereby a white precipitate, slightly soluble in water and alcohol, and readily soluble in dimethylformamide, is precipitated; yield: 14.2 g. 89% theory. At 110° to 130° C., the product foams up; however, it does not melt. According to the analysis, a diepoxide has formed which consists, on the average, of 3 molecules of epichlorohydrin and 2 molecules of trimethylene trisulfone.

$C_{15}H_{24}O_{15}S_6$ (M.W. 636) calc.: C, 28.30%; H, 3.87%; Epoxy No. 176. Found: C, 28.32%; H, 4.39%; Epoxy No. 156.

1 g. of the diepoxide and 0.3 g. of hexamethylene diamine are dissolved in 8 cc. of dimethylformamide. A film of 0.2 mm. thickness is applied to a glass plate and hardened in a vacuum drying chamber at 100° C. A clear hard film thus forms which adheres extremely firmly to the plate.

1 g. of diepoxide and 0.5 g. of phthalic anhydride are dissolved in 8 cc. of dimethylformamide. A film of a thickness of 0.2 mm. is applied to a glass plate and hardened in the vacuum drying chamber at 100° C. In this case, too, a clear, hard film is formed which adheres very tenaciously to the plate.

*Example 2*

9.25 g. (0.1 mol) of epichlorohydrin are added to 16.2 g. (0.05 mol) of benzyl-1,3,5-trimethylene trisulfone in 150 cc. 1 N sodium hydroxide. The mixture is stirred for 30 min. at 20° C. and neutralized thereafter with hydrochloric acid, whereby a precipitate soluble in alcohol and acetone and having a melting point of 75° C. is precipitated; yield: 17.5 g. 85% of theory. According to the values of an analysis, a diepoxide of 3 molecules of epichlorohydrin and 2 molecules of benzyl trimethylene trisulfone, on the average, is obtained.

$C_{29}H_{36}O_{15}S_6$ (M.W.) calc.: C, 42.60%; H, 4.41%; Epoxy No. 137. Found: C, 42.69%; H, 4.79%; Epoxy No. 129.

In the same manner as indicated in the previous examples, epichlorohydrin is reacted with the following 1,3,5-trimethylene trisulfone derivatives:

Allyl-trimethyl trisulfone (allyl-TMTS)

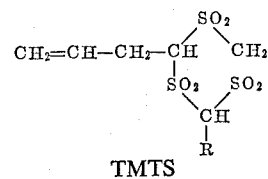

TMTS

Crotyl-TMTS $CH_3-CH_2=CH-CH_2-TMTS$

Methallyl-TMTS $$CH_2=C-CH_2-TMTS$$
$$|$$
$$CH_3$$

Cyclopentenyl-TMTS

[structure: cyclopentenyl-TMTS ring]

Tricyclodecenyl-TMTS

[structure: tricyclodecenyl-TMTS]

Endomethylene tetrahydrobenzyl-TMTS

[structure]—$CH_2$—TMTS

Benzoyl-TMTS

[phenyl]—$\overset{O}{\underset{\parallel}{C}}$—TMTS

The resultant compounds produce, thereby, similar advantageuos properties. Still other specific compounds can be produced by following the teachings of the examples, and employing the reactants and operating conditions previously described.

From the foregoing description, one skilled in the art can easily ascertin the essential characteristics of this invention; and without departing from the spirit and scope thereof, can make various changes and modifications of the invention to adapt it to various usages and conditions. Consequently, such changes and modifications are properly, equitably, and intended to be within the full range of equivalence of the following claims.

What is claimed is:

1. A compound of the formula:

[structure of compound with epoxide-CH-CH₂-CH(SO₂)₂CH-[CH₂-CH(OH)-CH₂-CH(SO₂)₂CH-]ₓ-CH₂-CH-CH₂ epoxide, with CHR groups]

wherein:

R is a member of the group consisting of:
(a) hydrogen;
(b) alkyl having 1–18 carbon atoms;
(c) an unsubstituted unsaturated aliphatic hydrocarbon group having 2–18 carbon atoms and containing 1–3 double bonds;
(d) an unsubstituted cycloaliphatic hydrocarbon group having 5–12 carbon atoms, and containing 0–3 double bonds;
(e) an unsubstituted aromatic hydrocarbon group having 6–10 carbon atoms;
(f) an unsubstituted aromatic hydrocarbon group of the formula

[benzene ring with $R'_n$ substituent]

wherein $n$ represents a numerical value between 1 and 4 and R' is selected from the group consisting of the preceding groups (b)–(d);

(g) an unsubstituted aralkyl hydrocarbon group having 7–17 carbon atoms;
(h) an unsubstituted ether group, R''—O—, wherein R'' is selected from the group consisting of the preceding groups (b)–(g); and
(i) an acyl group, R''—CO—, wherein R'' is selected from the group consisting of the preceding groups (b)–(g);

and wherein $x$ represents a numerical value between 0 and 20.

2. A compound as defined in claim 1 wherein $x$ represents a numerical value of between 0 and 10.

3. A compound as defined in claim 1 wherein R is hydrogen.

4. A compound as defined in claim 1 wherein R is benzyl.

5. A compound as defined in claim 1 wherein R is an unsaturated aliphatic hydrocarbon group having 1–18 carbon atoms and containing 1–3 double bonds.

6. A process for the production of the compounds of claim 1, which process comprises reacting at a pH of 8–15 epichlorohydrin with a 1,3,5-trimethylene trisulfone of the formula:

[structure of 1,3,5-trimethylene trisulfone with R substituent]

wherein:

R is a member of the group consisting of:
(a) hydrogen;
(b) alkyl having 1–18 carbon atoms;
(c) an unsaturated aliphatic hydrocarbon group having 2–18 carbon atoms and containing 1–3 double bonds;
(d) a cycloaliphatic hydrocarbon group having 5–12 carbon atoms, and containing 0–3 double bonds;
(e) an aromatic hydrocarbon group having 6–10 carbon atoms;
(f) a substituted aromatic hydrocarbon group

[benzene ring with $R'_n$ substituent]

wherein $n$ represents a numerical value between 1 and 4 and R' is selected from the group consisting of the preceding groups (b)–(d);
(g) an aralkyl hydrocarbon group having 7–17 carbon atoms;
(h) an ether group, R''—O—, wherein R'' is selected from the group consisting of the preceding groups (b)–(g); and
(i) an acyl group, R''—CO—, wherein R'' is selected from the group consisting of the preceding groups (b)–(g), said reaction being conducted under 80° C.

References Cited in the file of this patent

UNITED STATES PATENTS

| | | |
|---|---|---|
| 2,591,020 | Smith | Apr. 1, 1952 |
| 2,958,679 | Jones | Nov. 1, 1960 |